(12) United States Patent
Zumpano

(10) Patent No.: US 12,039,612 B1
(45) Date of Patent: Jul. 16, 2024

(54) APPARATUS AND METHOD FOR AUTOMATED RISK ASSESSMENT

(71) Applicant: Guidr, LLC, Naples, FL (US)

(72) Inventor: David J. Zumpano, Canastota, NY (US)

(73) Assignee: Guidr, LLC, Naples, FL (US)

( * ) Notice: Subject to any disclaimer, the term of this patent is extended or adjusted under 35 U.S.C. 154(b) by 0 days.

(21) Appl. No.: 18/205,170

(22) Filed: Jun. 2, 2023

(51) Int. Cl.
*G06Q 40/08* (2012.01)

(52) U.S. Cl.
CPC .................................. *G06Q 40/08* (2013.01)

(58) Field of Classification Search
CPC ... G06Q 40/04; G06Q 20/401; G06Q 30/0238
USPC .................................................... 705/35–45
See application file for complete search history.

(56) References Cited

U.S. PATENT DOCUMENTS

| | | | | |
|---|---|---|---|---|
| 8,612,266 B1* | 12/2013 | Ilgenfritz | .............. | G06Q 40/08 705/4 |
| 11,481,693 B1 | 10/2022 | Hess | | |
| 2006/0129428 A1* | 6/2006 | Wennberg | .............. | G16H 50/50 703/2 |
| 2008/0183636 A1* | 7/2008 | Walsh | .................... | G06Q 40/06 705/36 R |
| 2014/0164024 A1* | 6/2014 | Scone | .................... | G06Q 40/08 705/4 |
| 2023/0252573 A1* | 8/2023 | Chintakindi | ........... | G06Q 40/08 705/4 |

FOREIGN PATENT DOCUMENTS

| | | |
|---|---|---|
| CN | 110782361 A | 2/2020 |
| CN | 113256191 A | 8/2021 |
| WO | 2019/144035 A1 | 7/2019 |

\* cited by examiner

*Primary Examiner* — Robert R Niquette
(74) *Attorney, Agent, or Firm* — Caldwell Intellectual Property Law

(57) ABSTRACT

An apparatus for, and method of, automated risk assessment. The apparatus including a processor and a memory configuring the processor to receive a user input, generate an intent datum as a function of the user input, identify at least a risk datum as a function of the intent datum and at least a calculation metric; and generate a projection report as a function of a risk assessment machine learning model, wherein the risk assessment machine learning model receives user input and at least a risk datum as inputs and outputs at least a projection.

18 Claims, 10 Drawing Sheets

APPARATUS AND METHOD FOR AUTOMATED RISK ASSESSMENT

FIELD OF THE INVENTION

The present invention generally relates to the field of machine learning. In particular, the present invention is directed to automated asset risk assessment.

BACKGROUND

Computer models used for assessing risks and predicting future events are often inaccurate where the goals provided by a user do not correctly correspond to the intent of the user due to inaccurate information.

SUMMARY OF THE DISCLOSURE

In an aspect an apparatus for automated risk assessment that includes at least a processor and a memory communicatively connected to the at least a processor, where the memory contains instructions configuring the at least a processor to receive a user input, identify at least a risk datum as a function of the user input and at least a calculation metric; and generate a projection report as a function of a risk assessment machine learning model, wherein the risk assessment machine learning model receives user input and at least a risk datum as inputs and outputs at least a projection.

In another aspect a method of automated risk assessment, wherein the method includes receiving a user input, identifying at least a risk datum as a function of the user input and at least a calculation metric and generating a projection report as a function of a risk assessment machine learning model, wherein the risk assessment machine learning model receives user input and at least a risk datum as inputs and outputs at least a projection.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for automated asset risk assessment.

Figure 1:
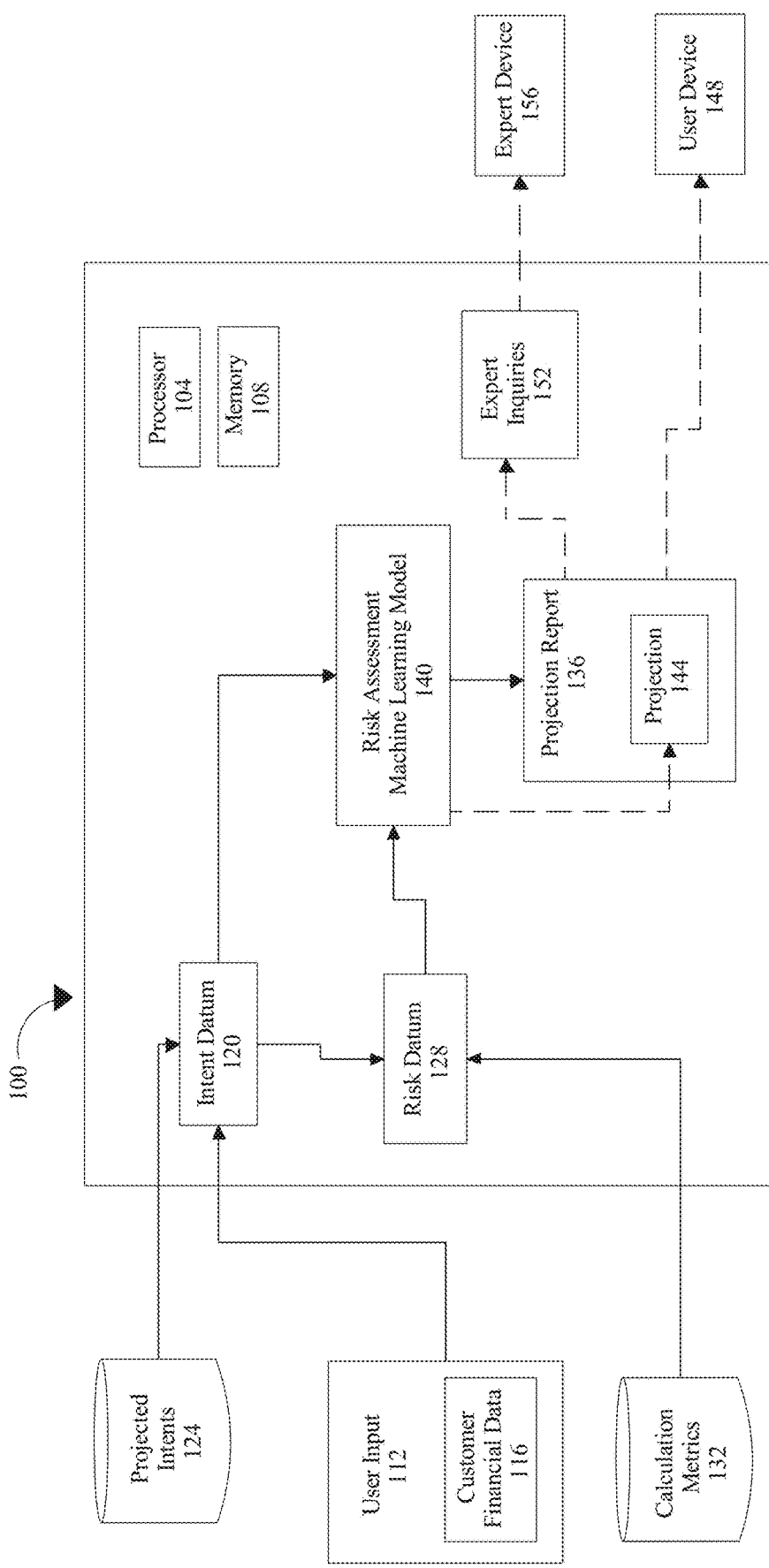
FIG. 1 is a block diagram illustrating an apparatus for automated risk assessment.

Referring now to FIG. 1, an exemplary embodiment of an apparatus 100 for automated asset risk assessment is illustrated. The apparatus 100 includes at least a processor 104. Processor 104 and at least a processor 104 are used interchangeably throughout this disclosure. Processor 104 may include, without limitation, any processor described in this disclosure. Processor 104 may be included in a computing device. Computing device may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor may include, and/or be included in, a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The computing device may include but is not limited to, for example, a computing device or cluster of computing devices in a first location and a second computing device or cluster of computing devices in a second location. The computing device may include one or more computing devices dedicated to data storage, security, distribution of traffic for load balancing, and the like. Processor 104 may distribute one or more computing tasks as described below across a plurality of computing devices, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, an apparatus 100 includes a memory 108 communicatively connected to at least a processor 104. For the purposes of this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

In an embodiment, methods and apparatuses described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q. A further example of asymmetrical cryptography may include lattice-based cryptography, which relies on the fact that various properties of sets of integer combination of basis vectors are hard to compute, such as finding the one combination of basis vectors that results in the smallest Euclidean distance. Embodiments of cryptography, whether symmetrical or asymmetrical, may include quantum-secure cryptography, defined for the purposes of this disclosure as cryptography that remains secure against adversaries possessing quantum computers; some forms of lattice-based cryptography, for instance, may be quantum-secure.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. In one embodiment, credentials generated are verifiable credentials that are tamper-proof statements regarding a user that are cryptographically signed by a generator of the credentials. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grostl hash function, the HAS-160 hash function, the JH hash function, the RadioGatUn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2n/2)$ for n output bits; thus, it may take on the order of 2256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. In some embodiments, a verifier may authenticate the generated credential via a decentralized identifier by using public/private key pairs on an immutable sequential listing to verify that the hashed credential belongs to a specific user. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. In some embodiments, through zero-knowledge proof claims, users may not need to expose their private credential and/or identity information to a decentralized platform as the validity of users' real-world credential and/or identity information is attested via a privacy-preserving protocol enabled by zero-knowledge proof technology while still remaining private. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other par ty to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

A "credential," as used in this disclosure, is information related to or defining an entity's authority, authorization, status, rights, access, or entitlement to privileges. In some embodiments, a user's credential may include a validation of the user's legal identity, social identity, financial identity, proof of creation, proof of interaction, proof of personhood, and the like. For instance, in a non-limiting example, the legal identity may include the user's real name, date of birth, home address, government ID such as driver's license, credit report, social security number, and the like. As used in this disclosure, a "social identity," is any identity information derived and/or attested from a relevant social group where the user is a member of. For instance, in a non-limiting example, the user's social identity may include identities and/or membership associated with a social media platform such as Facebook®, Twitter®, membership associated with a decentralized community, and the like. In some embodiments, the user's social identity may be the user's profile name and/or pictures associated with the user profile.

Continuing to refer to FIG. 1, in an embodiment, processor 104 is configured to receive a user input 112. A "user input," as used herein, is an element of data inputted into a computing system. In an embodiment, user input 112 may be information or commands provided by a user to a computing device. A "user," as used herein, is any individual, or entity, that utilizes apparatus 100. In a nonlimiting example, a user may be an individual performing their own financial planning. In another nonlimiting example, a user may be an attorney at a law firm using apparatus 100 as basis for drafting a will for a customer. In another nonlimiting example, user may be an attorney using apparatus 100 as basis for drafting a trust account, such as drafting a trust as to move assets for the purpose of qualifying a client for Medicaid. In some embodiments, user input 112 may be an input transmitted from one or more computing devices to processor 104. In an example, without limitations, user input 112 may be a Hypertext Transfer Protocol (HTTP) POST request from another computing device. An "http post request," as used herein, is a request sent to a web server to create or update a resource. In an embodiment, user input 112 may be received as a function of a chatbot. As used in the current disclosure, a "chatbot" is a computer program designed to simulate conversation with a user. In an embodiment, user input 112 may include customers personal information such as name, age, birth data, residential address, and the like. In some embodiments, user input 112 may include customer financial data 116. In embodiment, customer financial data 116 may include customer income sources. Customer income sources may include money earned through employment, investment, contract work and the like. In embodiments, customer financial data 116 may include customer expenses. Customer expenses may include money spent on transportation, housing, food, entertainment, utility bills, and the like. In some embodiments, customer financial data 116 may include customer debts. Customer debts may include money owed to lenders and/or creditors such as credit card debt, student loan debt, car financing debt, mortgage, and the like. In embodiments, customer financial data 116 may include customer investments portfolio. Customer investment portfolio may include a plurality of assets owned such as stocks, bonds, mutual funds, real state, cryptocurrency, and the like. In embodiments, customer financial data 116 may include customer tax liability. Customer tax liability may include a customer's overall tax position such as income tax liability, deductions, credits, tax deferral strategies, such as 401k and IRA accounts, and the like. In some embodiments, customer financial data 116 may include customer retirement goals. Customer retirement goals may include customer's financial objectives related to retirement such as desired retirement age, lifestyle in retirement, income requirements in retirement, and the like. In some embodiments, customer financial data 116 may include gifts received. In an embodiment, gifts received may be limited to a five-year period. Gifts received may include any type of gift a customer may have received in the last five years, such as monetary gifts, tangible gifts and the like. Gifts received may include inheritance gifts. In some nonlimiting examples, gifts received may affect a customer's tolerance for risks. In nonlimiting examples, gifts received may affect customer's tax liability, such as gifts that are taxable. Chatbot is described in more detail in reference to FIG. 3.

Still referring to FIG. 1, in some embodiments, processor 104 may be configured to generate at least an intent datum 120 as a function of the user input 112. An "intent datum," as a used herein, is a goal and/or purpose related to the user input 112. In some embodiments, generating at least an intent datum 120 may include mapping user input 116 to at least a projected intent 124. A "projected intent," as used herein, is a goal and/or purpose correlated to one or more elements of data. In a nonlimiting example, a chatbot may prompt user to answer whether the user owns any common stocks, bonds or mutual funds, to which a user may reply "yes." Continuing the nonlimiting example, a chatbot may prompt a user to answer a question, such as "please list total amount of liquid assets" where a user may answer "none," to which processor 104 may generate an intent datum 120 of "expert assistance" since the user does not intent to list liquid assets as none since at the previous prompt user answered yes. In a nonlimiting example, user may provide a user input 112 that includes textual input related to a person's long-term goal of ensuring their family financial stability once they are dead. Processor 104, in this nonlimiting example, may generate an intent datum 120 of "drafting a will and testament" based on user input 112.

Continuing to refer to FIG. 1, in an embodiment, processor may be configured to use intent datum 120 in conjunction with chatbot to receive user input 112. In a nonlimiting example, after receiving an input from a user, chatbot may present intent datum 120 to user and prompt user to confirm if intent datum 120 correlates to what information the user meant to covey. In a further example, after generating an intent datum 120 of "expert assistance," chatbot may convey to user that the information does not look correct and further ask whether user wants "expert assistance" in answering that question. In a further nonlimiting example, upon receiving a negative response, processor 104 may generate another intent datum 120 and prompt, using chatbot, for a response from the user to confirm if the second intent datum 120 correlates to what the user wants to convey. In some further examples, upon a second negative response, chatbot may generate a set of pointed questions related to the information user wants to convey. As used herein, a "pointed question" is a prompt with information specifically generated to gather further information related to a topic.

With continued reference to FIG. 1, in an embodiment, processor 104 may be configured to generate at least an intent datum 120 using a fuzzy set comparison. In a nonlimiting example, fuzzy set comparison may be used to generate an intent datum 120 of a user's common stocks, where intent datum 120 may include fuzzy sets with values including "sell," "buy" or "hold." In this nonlimiting example, a "buy" indication may be based on financial data related to that stock that indicates "strong earnings," "bullish outlook" and "positive market trends." Continuing with this nonlimiting example, a "hold" indication may include "poor earnings" coupled with "positive market trends." In this nonlimiting example, a "sell" indication may include factors such as "weak earning" and "negative market trends." In this nonlimiting example, if the input include "gains of only 5% for company A's stock", market projections for company A stock and indicators that user wants to reduced total assets owned with the goal of qualifying for Medicaid, a fuzzy set may be generated for the input that may include words related to the market conditions for the sector that company A operates in, market projection for company A, reducing assets owned, projected gains vs actual gains for the stock, and the like. The fuzzy sets may then be compared to pre-defined intents for stocks based on user's goals. In this nonlimiting example, the inputs will be assigned membership values for each fuzzy set, which in this example, without limitations, include "buy, "hold" and "sell." If the input has the highest similarity score, or membership value, to the intent set of "sell," then processor 104 may generate an intent datum 120 of "sell owned stocks of company A." Alternatively, if input has the highest similarity score to the intent set of "hold", then processor 104 may generate an intent datum of "hold stocks of company A in user's portfolio." Fuzzy set comparison is described in more detail in reference to FIG. 7.

With continued reference to FIG. 1, in some embodiments, processor 104 may use inference rules to generate intent datum 120 using fuzzy set comparison. Inference rules may include, without limitations, implication rules, aggregation rules, defuzzification rules, fuzzy reasoning rules and the like. In a nonlimiting example, an implication rule may be a rule specifying that "if a company operates in sector X and the stock gain is within a range of 0.5% and 6%, then the company is likely to underperform at its next quarter." In this nonlimiting example, processor 104 may imply a strong negative correlation between companies operating in sector X that had a stock gain of within that range and the likelihood that company will continue to underperform at the next quarter, where the closest the number is to 0.5% gain, the stronger the likelihood for underperformance. In this nonlimiting example, this implication rule may skew an output towards a "sell." In some embodiments, inference rules may be received from a database. In embodiments, inference rules may be inputted by a user. In embodiments, inference rules may be included in an expert database. In some embodiments, inference rules may be generated using a machine learning model. In some embodiments, machine learning model may be trained using training data. Training data may include user generated rules, such as relationships between words and intents preset by a user. Training data may include prior iterations of apparatus 100. In some embodiments, machine learning model may receive user input 112 that includes a corpus of words, and may generate an inference rule for those words. In a nonlimiting example, machine learning model may receive a corpus of words that includes "company A stock" and "gain of 4%," where machine learning model may output a rule that "if company A has a stock gain of within a range of 0.5% and 6%, intent is likely a 'sell'," where training data used includes a plurality of entries of "sell" intents correlated to "company A stock with a gains ranging from 0.5% and 6%." Fuzzy set comparison is described in more detail in reference to FIG. 7.

Continuing to refer to FIG. 1, in a nonlimiting example, an aggregation rule may be a rule specifying that "if user input 112 has a membership value of 0.7 for a 'hold' intent and a membership value of 0.3 for a 'sell' intent, then the overall intent for the stock is a 'hold' with a 0.7 confidence score." In this nonlimiting example, processor 104 may generate an intent datum of "hold" based on the rule implying that multiple possible intents can be combined and weighted to produce a single intent with a confidence score, such as a 0.7 confidence score for a "hold" intent. Fuzzy set comparison is described in more detail in reference to FIG. 7.

Still referring to FIG. 1, in nonlimiting examples, a defuzzification rule may include a rule to convert a fuzzy set to a final intent, such as a defuzzification rule specifying that "if the overall membership value of all possible intents is below a threshold, then more information is required." In this nonlimiting example, if an intent datum 120 of "drafting a will" is below a confidence score, processor 104 may prompt user, such as by using a chatbot, to confirm that intent datum 120 generated is correct. Fuzzy set comparison is described in more detail in reference to FIG. 7.

With continued reference to FIG. 1, in a nonlimiting example, a fuzzy reasoning rule may be a rule that "if previous intent was a "sell" for stocks of company A at a less than 5% gain and market conditions for sector related to company A is unchanged or worse than when previous intent was generated, then intent will likely be a 'sell' for company A stocks." In this nonlimiting example, fuzzy reasoning rule will skew intent datum 120 to be a "sell" for stock of company A based on prior intent datum 120 generated for that user. Fuzzy set comparison is described in more detail in reference to FIG. 7.

Still referring to FIG. 1, in some embodiments, processor 104 may be configured to generate at least an intent datum 120 using a neural network. In an embodiment, neural network may include a deep learning network. In an embodiment, neural network may be configured to receive user input 112 and generate a vector output representing intent datum 120. In some embodiments, vector output may include projected intents 124. In embodiments, neural network may be trained using training data. Training data may include previous user inputs 112 correlated to their respective intent datum 120. In embodiments, training data may include prior iterations of apparatus 100. In some embodiments, training data may include large datasets. In embodiment, training data may include prior queries, such as interactions between a user and a chatbot, correlated to generated intent data 120. In further embodiments, processor 104 may be configured to convert vector output into a fuzzy set representing the uncertainty and ambiguity of predicted intent. In embodiments, processor 104 may be configured to generate a new fuzzy set representing the degree of compatibility between predicted intent and know intents, wherein generating the new fuzzy set includes comparing, using fuzzy set comparison, the predicted fuzzy set with a set of inference rules. In a nonlimiting example, neural network may be trained using a large dataset that includes user queries, such as through a chatbot, correlated to intents previously generated. In this nonlimiting example, the trained neural network may generate a vector of predicted intents, where the vector is converted into a fuzzy set representing the uncertainty and ambiguity of the predicted intent. In this nonlimiting example, processor 104 may be configured to use fuzzy set comparison to compare the predicted fuzzy set with a an inference rule such as an implication rule that "if predicted intent has a membership value of 0.6 or more for a intent of 'hold stock A', the intent for stock A is a "hold." In this nonlimiting example, processor 104 may be configured to generate a new fuzzy set as a result of the comparison that represents the compatibility between the predicted intent and the known intents, such as from training data. In this nonlimiting example, an inference rule such as defuzzification may be used on the new fuzzy set to generate an intent datum 120 such as "hold stock A" intent with a confidence score of 0.6. In embodiments, In some embodiments, user input 112 may be received using a chatbot, where the chatbot may be configured to use the comparison to generate follow up prompts. In an example, without limitations, chatbot may prompt user to answer whether intent presented is the correct intent when confidence score for that intent is lower than a set threshold. In embodiments, processor 104 may generate a new user input 112 as a function of an answer to a chatbot prompt. In a further embodiment, processor 104 may generate a new intent datum 120 as a function of the new user input 112. In embodiments, the new intent datum 120 may be generated using a neural network. In a nonlimiting example, a user may answer a chatbot prompt with a new set if user input 112, where processor may generate an intent datum 120 for this new input using the neural network. In some embodiments, output from neural network may be transmitted to a database. In embodiments, output from neural network may include projected intents 124. Processor 104 may generate intent datum 120 using any methods and/or processes described in reference to FIGS. 4-7

Continuing to refer to FIG. 1, in some embodiments, processor 104 may be configured to output a vector of words and phrases using a neural network. In embodiments, neural network may be a deep learning network. In some embodiments, neural network may be trained using training data. In embodiments, training data may include a corpus of textual data. In some embodiments, corpus of textual data may be inputted by a user. In embodiments, corpus of textual data may be included in a database. In some embodiments, corpus of textual data may be an open-source dataset for Natural Language Processing (NLP) such as the Stanford Question Answering Dataset (SQuAD).

Continuing to refer to FIG. 1, in embodiments, processor 104 may be configured to use a scoring algorithm to generate intent datum 120. In an embodiment, scoring algorithm may be used for mapping user input 112 to a fuzzy set. In some embodiments, user input 112 may be received using a natural language model. In an embodiment, processor 104 may be configured to convert vector output into a fuzzy set, wherein the fuzzy set includes memberships in two or more fuzzy sets of an output that includes a value of a range of values corresponding to a linguistic value.

With continued reference to FIG. 1, in an embodiment, processor 104 may be configured to generate a semantic meaning category as a function of the fuzzy set membership and at least an inference rule. In embodiments, processor 104 may be configured to generate at least a semantic category for intent data 120. In embodiments, processor 104 may be configured to generate at least a semantic category for user input 112. In embodiments, processor 104 may be further configured to generate at least a semantic category for customer financial data 116. A "semantic meaning category," as used herein, is a group of words or phrases defined based on a set relationship. In nonlimiting examples, one semantic category may refer to industry sector category, such as "technology sector" and a company in the sector, such as "Apple INC." In other nonlimiting examples, another semantic category may refer to investment strategies, such as a "hold" term and "value investing." In embodiments, processor 104 using a chatbot may prompt user for information based on semantic meaning category. In a nonlimiting example, upon an input of "value investment for stock A," chatbot may prompt user if desired outcome is a "hold" parameter for stock A based on their relationship described by semantic meaning category. Generating the semantic meaning category may include any methods and/or processes described in reference to FIGS. 4-7.

Continuing to refer to FIG. 1, in embodiments, processor 104 may be configured to identify at least a risk datum 128 as a function of the intent datum 120 and at least a calculation metric 132. In other embodiments, processor 104 may be configured to identify at least a risk datum 128 as a function of the user input 112 and at least a calculation metric 132. A "risk datum," as used herein, is a specific type of risk that a customer may be exposed to. In some embodiments, risk datum 128 may be represented as a level of exposure. A risk datum 128 may interchangeably be referred to as risk data 120 when referred to in plural form. A "calculation metric," as used herein, is a quantifiable measurement used for tracking, analyzing and evaluating specific aspects related to financial performance and risk management. Calculation metric 132 may be a numerical value used for assessing progress, identifying areas of improvement and making data-driven decisions related to risk. In some nonlimiting examples, calculation metric 132 may include return on investment (ROI), price-to-earnings (P/E) ratio, beta, sharpe ration, debt-to-income ratio, risk tolerance, standard deviation, value at risk (VaR) and the like. In some embodiments, risk tolerance may be a measure of a customer's willingness to take on financial risk. In some embodiments, beta may be a measure of an asset's sensitivity to market volatility. In embodiments, standard deviation may be a measure of the volatility of an investment, or asset, return. In embodiments, sharpe ratio may be a measure of an investment's risk-adjusted return. In embodiments, value at risk (VaR) may be a measure of the potential loss of an investment over a specified period of time and a given level of confidence. In embodiments, debt-to-income ratio may be a measure of a customer's debt relative to their income. It will be apparent to one of ordinary skill in the art, upon reading this disclosure, that calculation metrics 132 are discussed in a way of example and that it may include may other metrics not discussed in this disclosure.

Still referring to FIG. 1, in some embodiments, calculation metric 132 may further include projected funeral costs. In an embodiment, projected funeral costs may include average costs within customer's location. In some embodiments, projected funeral costs may include average costs for a location within customer's funeral preferences. In some embodiments, data used for projected funeral costs may include data from State Funeral Director Associations, Funeral planning resources, and the like. Funeral preferences may be a separate document outlining funeral arrangement details. Funeral preferences may be included in a customer's will. In some embodiments, calculation metric 132 may include projected long-term care costs, such as nursing home and assisted living costs. Projected long-term care costs may include data provided by health insurance companies, Genworth Cost of Care Survey, Medicaid Long-Term Care Expenditures Reports, State Lon-Term Care Ombudsman programs, and the like. In some embodiments, calculation metric 132 may include projected health insurance costs. Projected health insurance costs may include table of prices set by health insurance companies, Medicare Physician fee Schedule, Medicare Outpatient Prospective Payment System, Medicare Part D Prescription Drug prices, disclosed negotiated prices between hospitals and patients, and the like. In an embodiment, calculation metrics 132 may include state-specific Medicaid requirements. In some embodiments, Medicaid requirements may be received from state run Medicaid websites. In embodiments, Medicaid requirements may be received from federally run Medicaid websites. In a nonlimiting example, Medicaid requirements may be received from the official website of the Centers for Medicare & Medicaid Services (CMS), which is the federal agency that administers Medicaid that provides information on eligibility requirements, covered services, and other aspects of the Medicaid program. In another nonlimiting example, Medicaid requirements for a New York resident may be received from the New York State Department of Health's Medicaid website, which provides information regarding eligibility such as income limits and asset limits. Calculation metrics 132 are discussed in further detail in reference to FIG. 2.

Continuing to refer to FIG. 1, in some embodiments, processor 104 may be further configured to identify at least a risk datum 128 using a fuzzy set comparison. In some embodiments, processor 104 may identify a set of events as a function of calculating metrics 124. In further embodiments, processor 104 may determine a level of exposure by a customer, or client, based on user input 112. In a nonlimiting example, processor may identify an event related to a penalty being applied to a customer based on Medicaid requirements, where processor 104 may determine a level of exposure of an asset protection plan using fuzzy set comparison. Fuzzy sets are discussed in more detail in reference to FIG. 7.

With continued reference to FIG. 1, in an embodiment, processor 104 may be further configured to identify at least a risk datum 128 using a neural network. Identifying at least a risk datum 128 may include any methods and/or processes described in reference to FIGS. 4-7.

Continuing to refer to FIG. 1, projected long-term care costs and/or local projected funeral care costs may be gathered using a natural language model. Natural language model may include automatic speech recognition. A "natural language model," as used herein, is a type of artificial intelligence model that is designed to understand and generate natural language similarly to how a human speaks and/or writes. Natural language models may utilize techniques such as machine learning, deep learning and natural language processing (NLP) to analyze and understand language data. NLP may include text classification, name entity recognition, sentiment analysis, language translation, and the like. In some embodiments, Natural language model may include automatic speech recognition (ASR) technology to convert spoken language into written text. In an embodiment, processor 104 may be configured to initiate a voice call, such as a phone call over cellular networks, landline calls, Voice over Internet Protocol (VoIP), and the like. In a nonlimiting example, processor 104 may gather projected funeral costs by initiating a voice call with a funeral home within a customer's location and utilize a natural language model to gather data from a human, such as a funeral home receptionist. In a further nonlimiting example, processor 104 may initiate a call with a prompt "Hello, how much is a cremation?" to which an attendant may respond with a price. In this nonlimiting example, processor 104 may translate the response into a written value, such as creating an entry in a database for projected cost for cremation at that location. In further nonlimiting examples, processor 104 may gather cost information for cremation from multiple funeral homes within a region "A", aggregate all the values and create an entry for projected cost for cremation within region "A". Natural language models may include any methods and processes described with reference to FIGS. 4-7.

Still referring to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Alternatively or additionally, in some cases, processor 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

Still referring to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

Still referring to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

Still referring to FIG. 1, an exemplary algorithm employed in automatic speech recognition may include or even be based upon hidden Markov models. Hidden Markov models (HMIs) may include statistical models that output a sequence of symbols or quantities. HMIs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

Still referring to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

Still referring to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and an linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

Still referring to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

Still referring to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of the best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighted by their estimated probability. In some cases, an employed loss function may include Levenshtein distance, although different distance calculations may be performed, for instance for specific tasks. In some cases, a set of candidates may be pruned to maintain tractability.

Still referring to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow processor 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

Still referring to FIG. 1, in some embodiments, an automatic speech recognition process may include a neural network. Neural network may include any neural network, for example those disclosed with reference to FIGS. 4-7. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In embodiments, neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time intervals, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LSTM) and related recurrent neural networks (RNNs) and Time Delay Neural Networks(TDNN's) may be used for automatic speech recognition, for example over longer time intervals for continuous speech recognition.

With continued reference to FIG. 1, in embodiments, processor 104 may be configured to generate a projection report 136 as a function of intent datum 120 and at least a risk datum 128. In an embodiment, processor 104 may be configured to generate a projection report 136 as a function of user input 112 and at least a risk datum 128. In embodiments, processor 104 may be configured to generate projection report 136 as a function of a risk assessment machine learning model 140. A "projection report," as used herein, is a hierarchical data structure configured to display information on a computing device. In embodiments, projection report may include estimations and/or forecasts of a user's financial performance and risk. In some nonlimiting examples, projection report 136 may be in a plurality of formats such as lists, charts, interactive graphical representations, and the like. In some embodiments, projection report 136 may configured to modify a computing device. In further embodiments, projection report 136 may be configured to modify a graphical user interface (GUI). In embodiments, modifying a graphical user interface may include changing appearance, size, font, style, spacing and the like. In embodiments, projection report 136 may include a set of instructions configuring an application logic of a computing device. In embodiments, projection report 136 may include instructions related to adding/removing event listeners, updating data bindings, input handlers, and the like. In some embodiments, projection report 136 may include instructions configuring computing device to add/remove components, rearrange layout of display, modify set behaviors based on user interaction. In a nonlimiting example, projection report 136 may configure computing device to display data in interactive format, where user may open different sets of data in separate windows, or sections, of display. In an embodiment, projection report 136 may include at least a projection 136. In embodiments, projection reports may include a plurality of projections 136. A "projection," as used herein, is a correlation between one or more items of user input 112 and at least a risk datum 128. In an embodiment, projection 136 may be an item of projection report 136. In a nonlimiting example, projection 136 may be an assessment related to one risk datum 128 of a plurality of risk data 120 included in projection report 136. In another nonlimiting example, projection report 136 may include a correlation of assets to Medicaid qualification, where the assets above Medicaid qualification maximum may be correlated to a risk datum 128 of healthcare costs associated with not being covered by Medicaid. In some embodiments, a user's assets may include investments, annuities, cash assets, real property, automobiles, life insurance, retirement accounts, and the like. In other embodiments, risk assessment machine learning model 140 may correlate customer financial data 116 to at least a risk datum 128. In some embodiments, risk assessment machine learning model 140 may receive user input 112 and at least a risk datum 128 as inputs and outputs at least a projection 136. In a nonlimiting example, risk assessment machine learning model 140 may receive a monetary asset as user input 112 and a long-term healthcare cost, such as nursing home costs, as a risk datum 128 and output a projection 136 of how many months it will take for the monetary asset to be depleted if the customer is not covered by Medicaid.

Continuing to refer to FIG. 1, in embodiments, risk assessment machine learning model 140 may be trained using risk assessment training data. Risk assessment training data may include any training data described throughout this disclosure. Risk assessment training data may include prior iterations of risk assessment machine learning model 140. In embodiments, risk assessment training data may include correlations of user input 112 and at least a risk datum 128. In embodiments, risk assessment training data may include mock data. As used herein, "mock data" refers to data generated for the purpose of training a machine learning model, such as data created by software engineers for improving accuracy of models. In nonlimiting examples, risk assessment training data may include prior user input data 112 such as health records, medical histories, and financial data correlated to Medicaid data. Training data may be preprocessed. A "preprocessed training data," as used herein, is data that have been transformed from raw form to a format that can be used for training a machine learning model. Preprocessing may include data cleaning, feature selection, feature scaling, data augmentation and the like. Data cleaning may include steps such as removing replicated data, handling missing data, correcting data errors, standardizing data, identifying outliers, and the like. In a nonlimiting example, data cleaning may include utilizing algorithms for identifying duplicate entries or spell-check algorithms. In some embodiments, preprocessing may include utilizing machine-learning algorithms. In a nonlimiting example, machine learning may be used for identifying relevant data to be used as training data, such as for a feature selection preprocessing step. Training data may include any training data described in reference to FIGS. 4-7.

Continuing to refer to FIG. 1, in some embodiments, projection report 136 may include a Medicaid Qualification worksheet. A "Medicaid Qualification worksheet," is a report, or tool, that provides information related to Medicaid eligibility based on a plurality of factors. In some embodiments, Medicaid Qualification worksheet may be generated based on user input 112 and at least a risk datum 128. In embodiments, Medicaid Qualification worksheet may be generated based on customer financial data 116 and at least a risk datum 128. In further embodiments, Medicaid Qualification worksheet may be generated as a function of risk assessment machine learning model 140. In a nonlimiting example, Medicaid Qualification worksheet may provide eligibility information based on user input 112 related to a customer's income, household size, residency status, disability status, assets owned, medical conditions, and a calculation metrics 132 such as projected long term health care costs, such as assisted living and nursing homes, cost and availability of private care, overall insurance costs to the state, percentage of population enrolled in the state's Medicaid program, and the like. In some embodiments, Medicaid Qualification worksheet may include a parameter for the minimum number of months for a customer to qualify to Medicaid. In a nonlimiting example, Medicaid Qualification worksheet may include a minimum number of months of 10 months to qualify for Medicaid based on a set strategy of projection report.

With continued reference to FIG. 1, in an embodiment, projection report 136 may include an Asset Protection Letter. An "Asset Protection Letter," as used herein, is a legal document used to protect an individual's, or entity's, assets from potential lawsuits, creditors, penalties, taxes, legal actions, and the like. In some embodiments, Asset Protection Letter may include strategies to protect customer's assets, also referred herein as asset protection plan. In an example, without limitations, strategies may include instructions related to creating trusts, forming Limited Liability Company or corporation, transferring assets to other individuals or entities, establishing homestead exceptions, and the like. In a nonlimiting example, processor 104 may generate projection report 136 that includes a Medicaid Qualification worksheet defining the maximum assets a customer may have to qualify for Medicaid and an Asset Protection Letter setting a strategy for transferring assets to a trust in excess of the maximum asset limit as to allow customer to qualify for Medicaid. In an embodiment, projection report 136 may include a monthly deficit parameter. A "monthly deficit parameter," as used herein, is an asset protection plan that creates an asset protection letter for qualifying for Medicaid based on Medicaid's five-year lookback period. A "five-year lookback period," as used herein, is a five year period preceding Medicaid application where a government agency reviews financial transfers to determine if asset transfers were made for the purpose of qualifying for Medicaid. In a nonlimiting example, monthly deficit parameter may include a plan based on transfers for fair market value, or to a spouse, which are usually exempted from the five-year lookback plan.

Continuing to refer to FIG. 1, in some embodiments, projection report 136 may include an asset risk analysis chart. An "asset risk analysis chart," as used herein, is a chart used to evaluate and analyze the potential risks associated with different types of assets in a portfolio. In an example, without limitations, the asset risk analysis chart may list different assets in rows and risk data 120 in columns. In some further embodiments, asset risk analysis chart may be an interactive graphical representation where a user may be able to select a specific risk datum 128 the user wants to visualize related to the assets. Alternatively, in further embodiments, user may be able to select which assets the user wants to visualize related to at least a risk datum 128. In some embodiments, level of risk may be categorized using a numerical scale and/or a color-coding system. Devices capable of allowing an interactive graphical representation are discussed in more detail below. It will be apparent to one of ordinary skill in the art, upon reading this disclosure, of the many ways that asset risk analysis may be displayed and/or interacted with that are not discussed in this disclosure.

Still referring to FIG. 1, in an embodiment, projection report 136 may include a funding roadmap. A "funding roadmap," as used herein, is a strategic plan outlining a set of steps and entity, such as a company or organization, may take to secure funding to achieve specified goals. In some examples, without limitations, funding roadmap may include timelines, milestones, specific actions to be taken, and the like. In further nonlimiting examples, funding roadmap may include specific sources of funds such as venture capital firms, angel investors, grants, crowdfunding, and the like. In an embodiment, projection report 136 may include an asset transfer based on Medicaid Qualification worksheet and a funding roadmap. In a nonlimiting example, projection report 136 may include an Asset Protection plan for an individual that transfers excess assets as to qualify for Medicaid while it may also include a funding roadmap that includes those transferred assets as a funding source.

Continuing to refer to FIG. 1, in an embodiment, processor 104 may be configured to store projection report 136 in an immutable sequential listing. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered. Immutable sequential listing is discussed in more detail in reference to FIG. 8.

Still referring to FIG. 1, in embodiments, processor 104 may be configured to transmit projection report 136 to a user device 148. A "user device," as used herein is any computing device capable of displaying information. In embodiments, transmitting projection report 136 to user device may include modifying user device as a function of projection report 136. In an embodiment, user device 148 may include a graphical user interface (GUI). In embodiments, user device 148 may include any device capable of displaying a Graphical User Interface (GUI). In an embodiment, user device 148 may include a Graphical User Interface (GUI). In embodiments, user device 148 may be configured to display any data structure described throughout this disclosure. In nonlimiting examples, user device 148 may be a smartphone, smartwatch, laptop, desktop computer, virtual reality headset and the like. In embodiments, user device 148 may include a display. Display may include any display capable of presenting information in graphical form. In embodiments, the display may be configured to display a GUI. In a nonlimiting example, projection reports 136 may include instructions configuring user device 148 to display a GUI. In embodiments, user device 148 may include a plurality of display. In embodiments, display may be configured to display a window. A "window," as used herein, is a graphical representation that occupies at least a position of the display. In some examples, without limitation, projection report 136 may include instructions configuring user device 148 to display two separate windows, where each window may be configured to display a set of data. In embodiments, window may occupy the entire display. In some embodiments, the display may be communicatively connected to user device 148. In some embodiments, a window may include one or more tabs. A "tab," as used herein, is a subsection of a window. In a nonlimiting example, projection report 136 may include a set of instructions configuring user device 148 to display separate sets of data in separate tabs within a window. In an example, without limitations, a user may navigate through a first second, third and fourth window (and so on) by interacting with display. In another nonlimiting example, a user may navigate through a first second, third and fourth window (and so on) by interacting directly with user device 148, and indirectly with the display, such as when information is being transmitted to a remote display. Projection report 136 may contain instructions configuring event handlers, wherein the placement of text within a textbox may signify to user device 148 to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input.

Continuing to refer to FIG. 1, in an embodiment, processor 104 may be configured to generate an expert inquiry 152 as a function of the projection report 136. In some embodiments, processor 104 may be configured to generate an expert inquiry 152 for each projection 144 in projection report 136. An "expert inquiry," as used herein, is a one or more questions for an expert. An "expert," as used herein, is someone with trained knowledge in a field. Experts may include attorneys, doctors, veterinarians, professors, researchers and the like. In some embodiments, expert inquiry 152 may include intent data 120. In a nonlimiting example, an expert inquiry 152 may be generated for a projection report 136 generated based on an intent datum 120 with a confidence score below a set threshold. In a further nonlimiting example, a projection report 136 generated based on an intent datum 120 of "draft a will" generated with a confidence score below 0.4 may be sent to an expert for further analysis. In embodiments, processor 104 may be further configured to transmit expert inquiry 152 to an expert device 156. Expert device 156 may include any computing device described throughout this disclosure.

Figure 2:
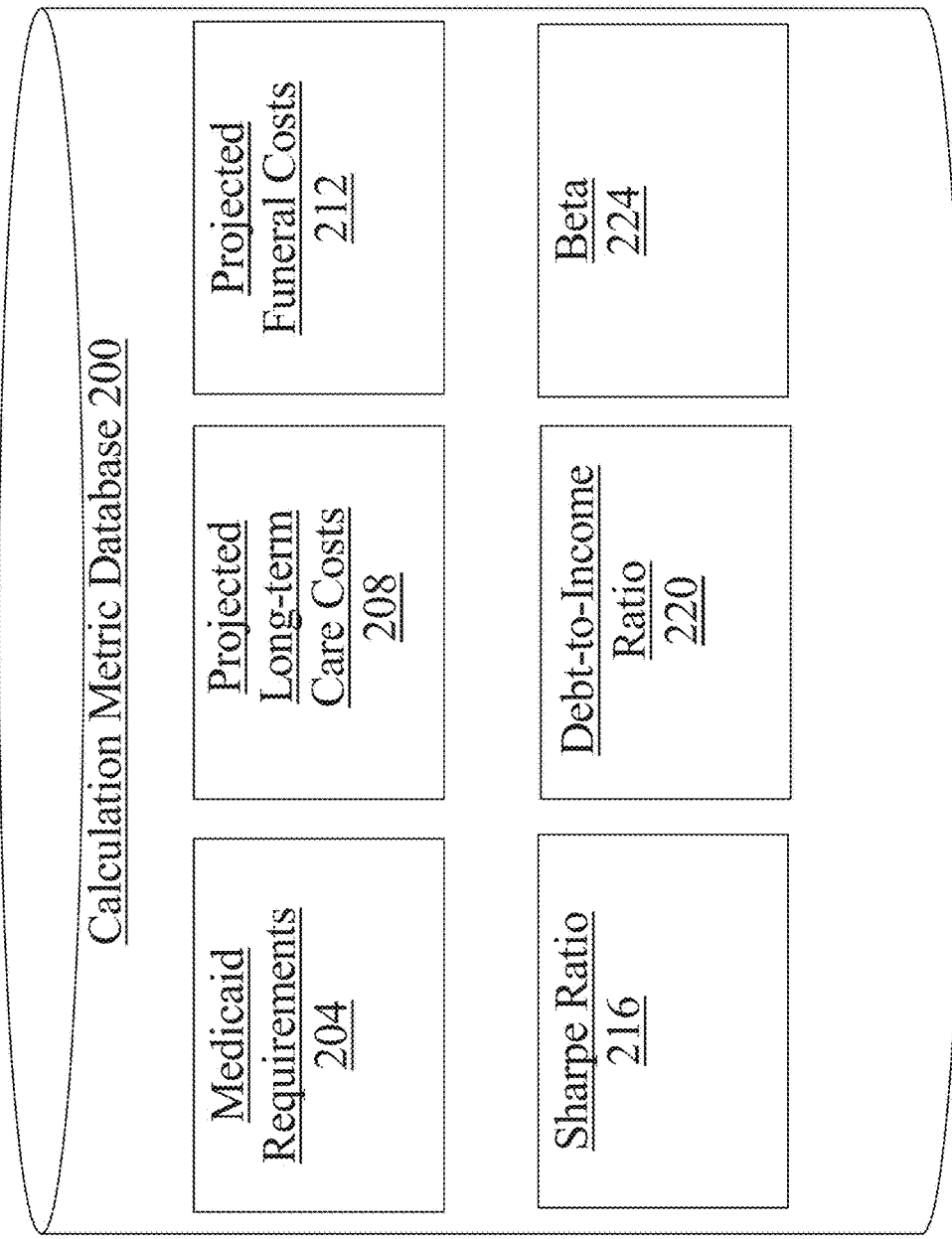
FIG. 2 an exemplary embodiment of a calculation metric database.

Now referring to FIG. 2, an exemplary embodiment of a calculation metric database 200 is presented. In an embodiment, calculation metric database 200 may include Medicaid requirements 204. In embodiments, calculation metric database 200 may include projected long-term care costs 208. In embodiments, calculation metric database 200 may include projected funeral costs 212. In some embodiments, calculation metric database 200 may include shape ratio 216. In embodiments, calculation metric database 200 may include debt-to-income ratio 220. In embodiments, calculation metric database 200 may include beta 224. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 3:
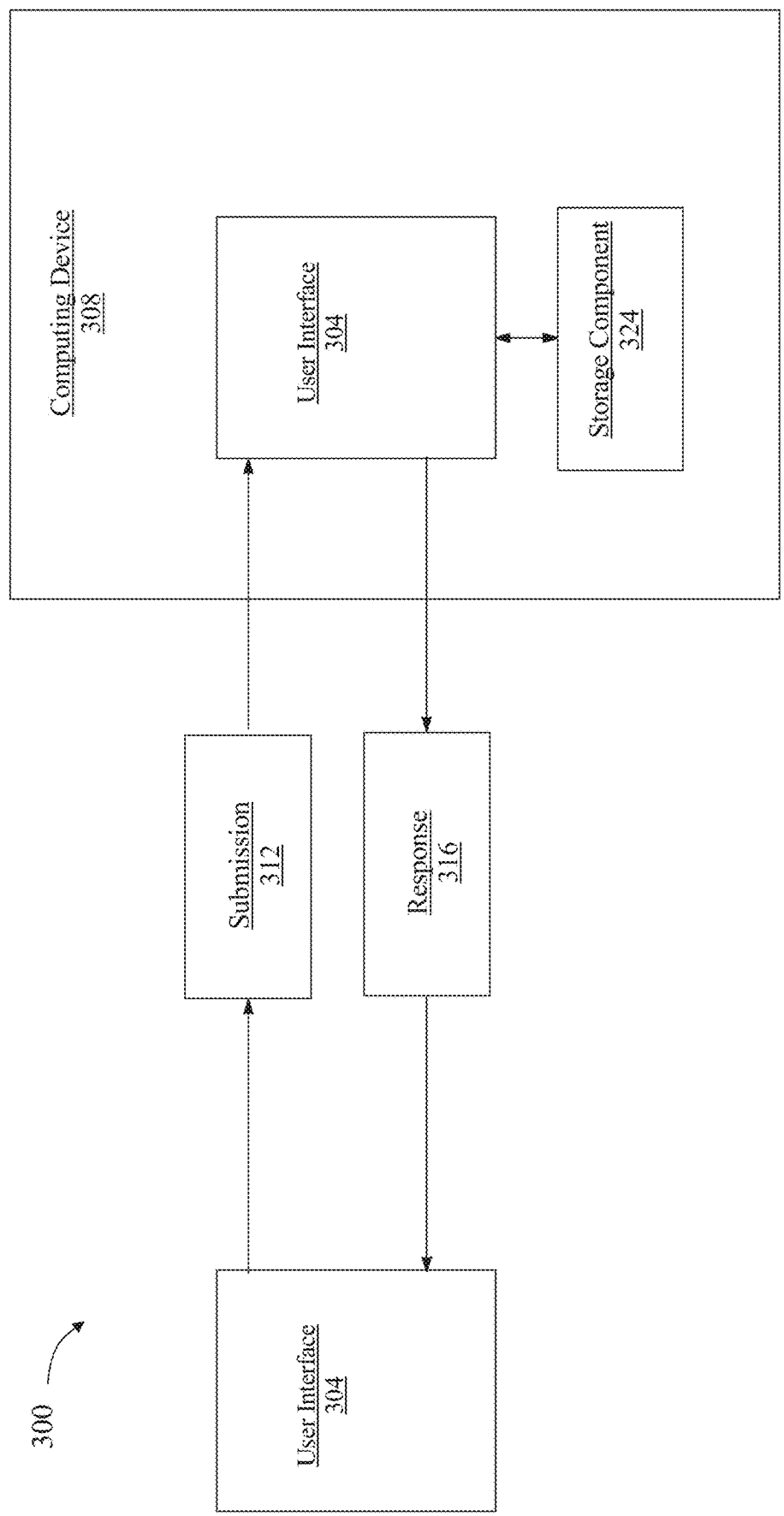
FIG. 3 is a block diagram of a chatbot system.

Referring now to FIG. 3, an exemplary embodiment of a chatbot system 300 is presented. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with user device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 308 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 3112 using one or more of keyword recognition, pattern matching, and natural language processing. In some embodiments, processor employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304. In some cases, an answer to an inquiry present within a submission 312 from a user device 304 may be used by processor 104 as an input to another function, for example without limitation an asset type from customer financial data 116.

Figure 4:
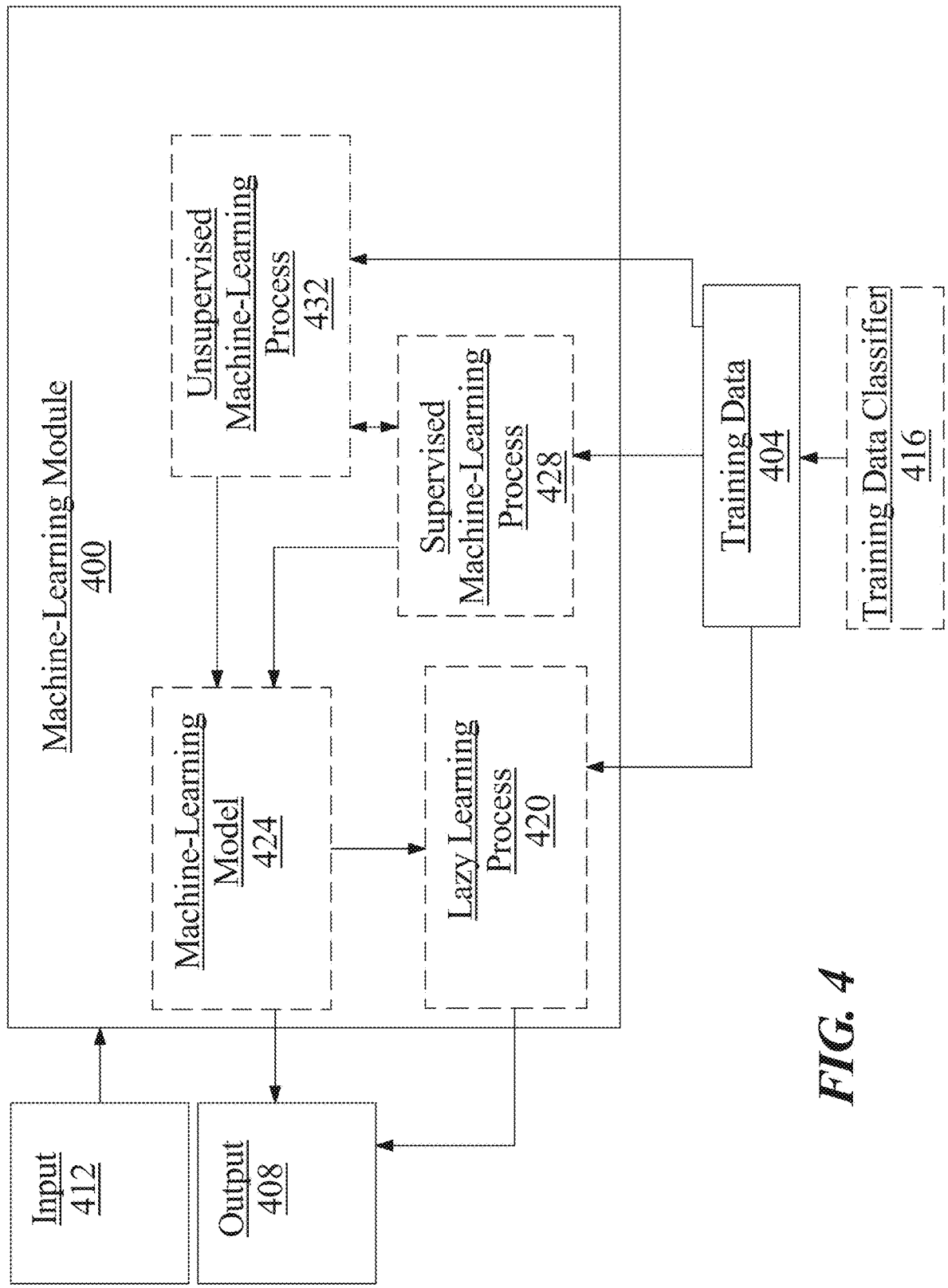
FIG. 4 is a block diagram of an exemplary embodiment of a machine learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below.

Training data 404 used by machine-learning module 400 may correlate any input data as described in this disclosure to any output data as described in this disclosure. As a non-limiting illustrative example inputs may include customer financial data 116 and calculation metrics 132 correlated to risk data 120.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to Medicaid requirements 204.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include customer assets and projected nursing home costs as described above as inputs, rate of asset depletion as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
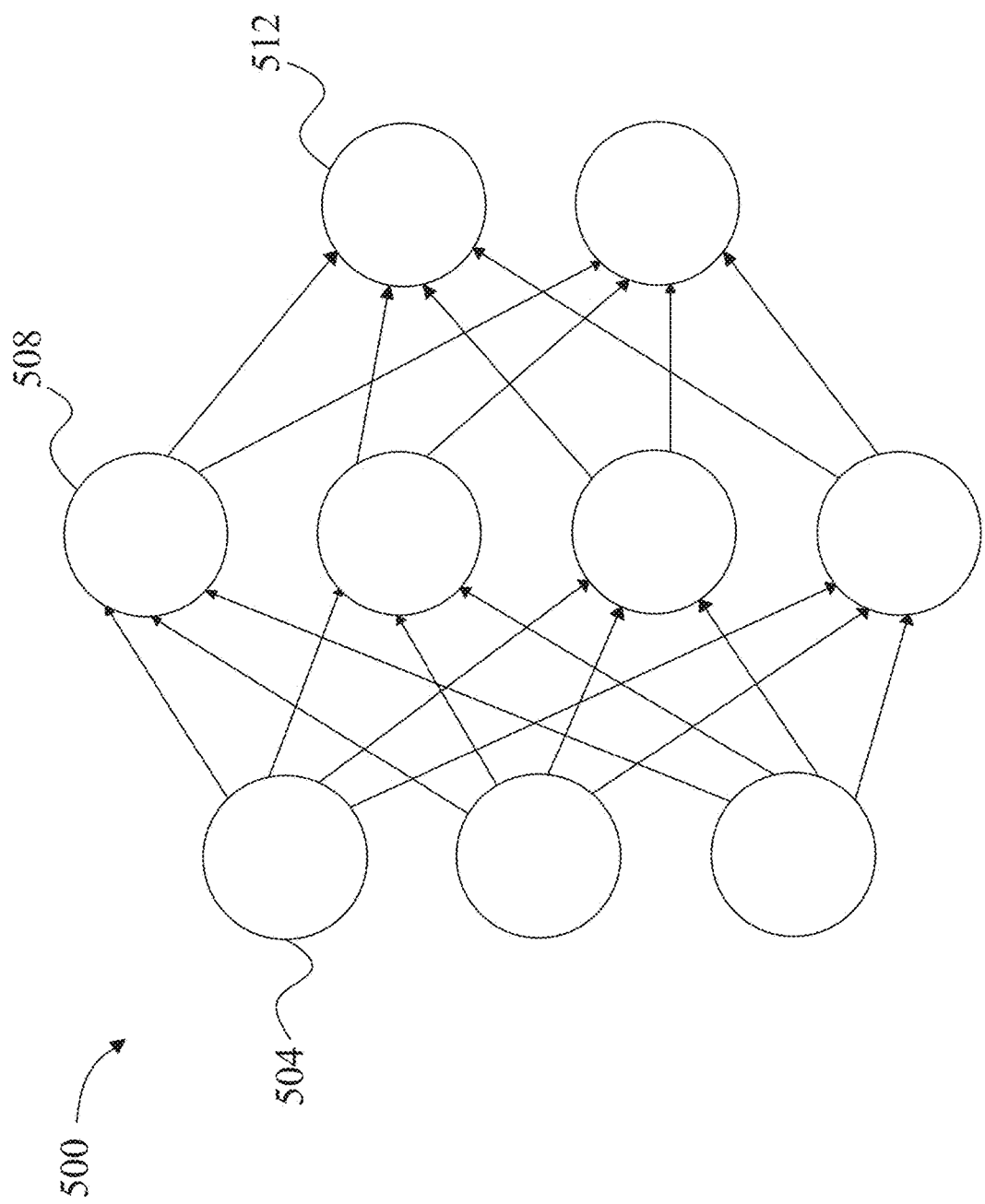
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
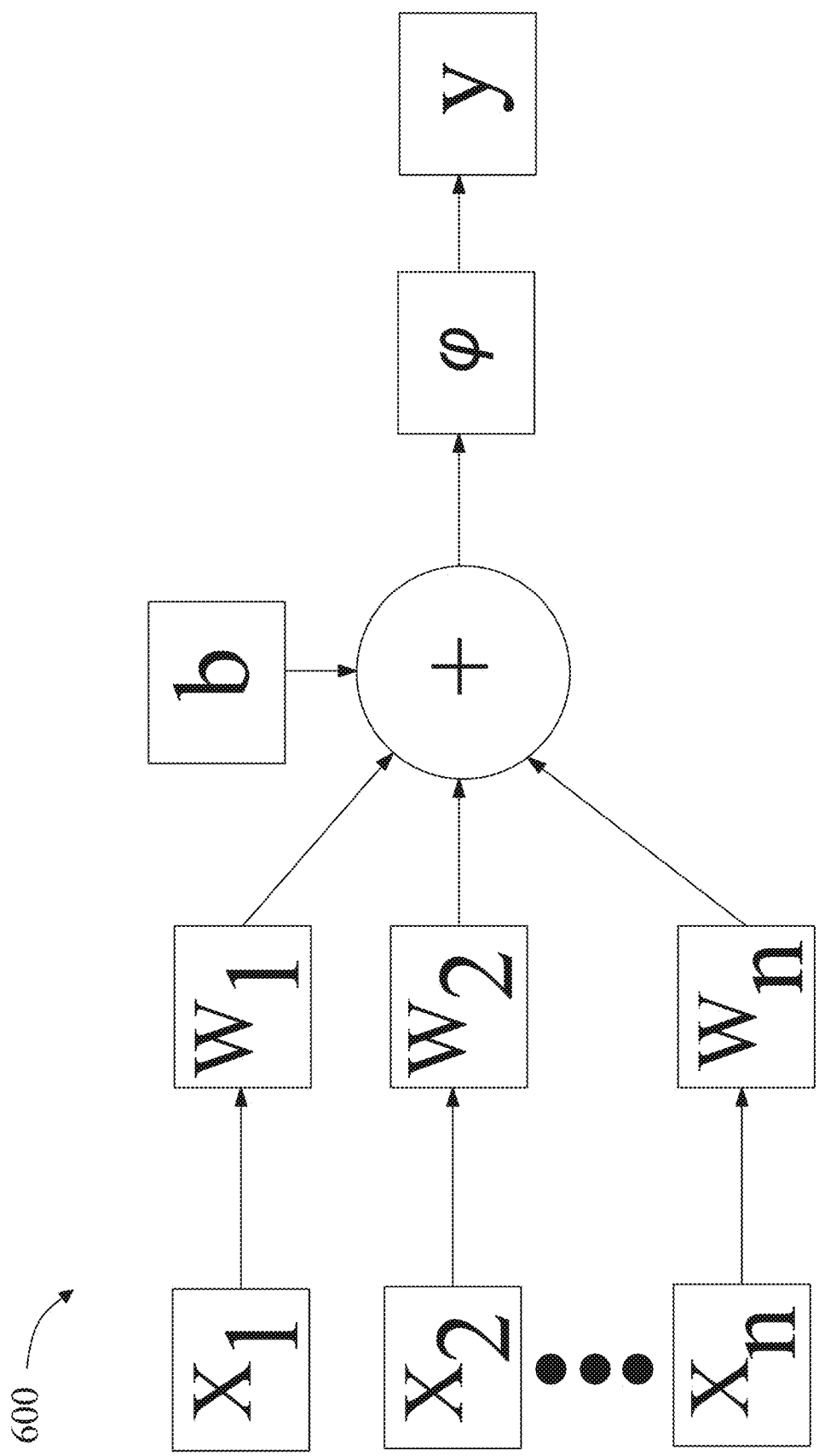
FIG. 6 is a diagram of an illustrative embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $f(x)=1/1-e^{-x}$ given input x, a tanh (hyperbolic tangent) function, of the form $e^x-e^{-x}/e^x+e^{-x}$, a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\mathrm{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function ω, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
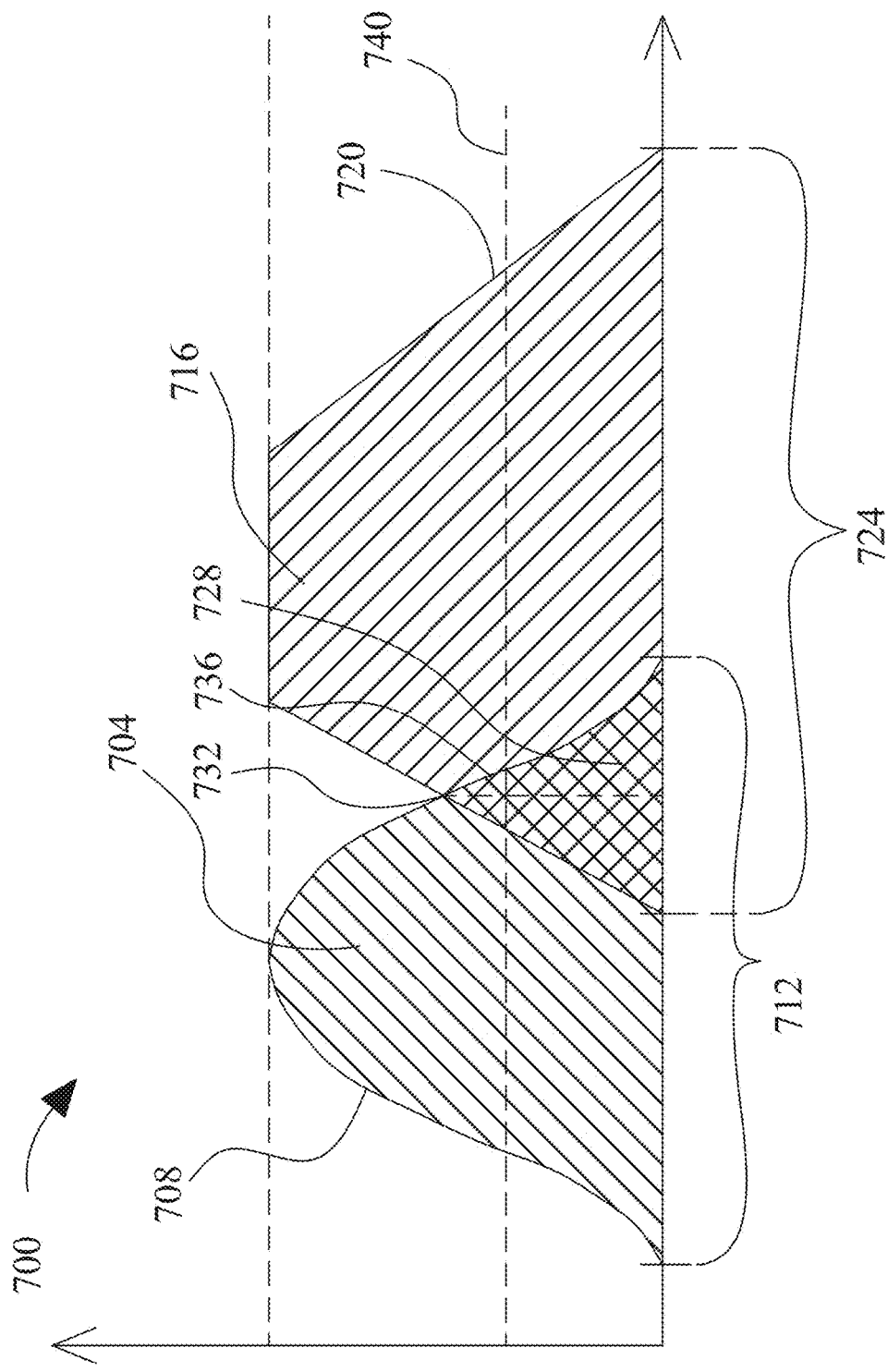
FIG. 7 is a graph illustrating an exemplary relationship between fuzzy sets.

Referring now to FIG. 7, an exemplary embodiment of fuzzy set comparison 700 is illustrated. A first fuzzy set 704 may be represented, without limitation, according to a first membership function 708 representing a probability that an input falling on a first range of values 712 is a member of the first fuzzy set 704, where the first membership function 708 has values on a range of probabilities such as without limitation the interval [0,1], and an area beneath the first membership function 708 may represent a set of values within first fuzzy set 704. Although first range of values 712 is illustrated for clarity in this exemplary depiction as a range on a single number line or axis, first range of values 712 may be defined on two or more dimensions, representing, for instance, a Cartesian product between a plurality of ranges, curves, axes, spaces, dimensions, or the like. First membership function 708 may include any suitable function mapping first range 712 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 7, first fuzzy set 704 may represent any value or combination of values as described above, including output from one or more machine-learning models. A second fuzzy set 716, which may represent any value which may be represented by first fuzzy set 704, may be defined by a second membership function 720 on a second range 724; second range 724 may be identical and/or overlap with first range 712 and/or may be combined with first range via Cartesian product or the like to generate a mapping permitting evaluation overlap of first fuzzy set 704 and second fuzzy set 716. Where first fuzzy set 704 and second fuzzy set 716 have a region 728 that overlaps, first membership function 708 and second membership function 720 may intersect at a point 732 representing a probability, as defined on probability interval, of a match between first fuzzy set 704 and second fuzzy set 716. Alternatively or additionally, a single value of first and/or second fuzzy set may be located at a locus 736 on first range 712 and/or second range 724, where a probability of membership may be taken by evaluation of first membership function 708 and/or second membership function 720 at that range point. A probability at 728 and/or 732 may be compared to a threshold 740 to determine whether a positive match is indicated. Threshold 740 may, in a non-limiting example, represent a degree of match between first fuzzy set 704 and second fuzzy set 716, and/or single values therein with each other or with either set, which is sufficient for purposes of the matching process; for instance, threshold may indicate a sufficient degree of overlap between an output from one or more machine-learning models.. Alternatively or additionally, each threshold may be tuned by a machine-learning and/or statistical process, for instance and without limitation as described in further detail below.

Further referring to FIG. 7, in an embodiment, a degree of match between fuzzy sets may be used to classify a task with a current role 132. For instance, if a task has a fuzzy set matching a task associated with a role fuzzy set by having a degree of overlap exceeding a threshold, processor 102 may classify the condition as belonging to a goal. Where multiple fuzzy matches are performed, degrees of match for each respective fuzzy set may be computed and aggregated through, for instance, addition, averaging, or the like, to determine an overall degree of match.

Still referring to FIG. 7, in an embodiment, a task may be compared to multiple user state fuzzy sets. For instance, task may be represented by a fuzzy set that is compared to each of the multiple current role fuzzy sets; and a degree of overlap exceeding a threshold between the condition fuzzy set and any of the multiple current role fuzzy sets may cause apparatus 100 to classify the condition as belonging to a goal. For instance, in one embodiment there may be two goals fuzzy sets, representing respectively a pecuniary and a health goal. Pecuniary goal may have a pecuniary fuzzy set; health goal may have a health fuzzy set; and condition may have a condition fuzzy set. Processor 104, for example, may compare a condition fuzzy set with each of pecuniary fuzzy set and health fuzzy set, as described above, and classify a condition to either, both, or neither of pecuniary or health. Machine-learning methods as described throughout may, in a non-limiting example, generate coefficients used in fuzzy set equations as described above, such as without limitation x, c, and a of $\alpha$ Gaussian set as described above, as outputs of machine-learning methods. Likewise, task may be used indirectly to determine a fuzzy set, as task fuzzy set may be derived from outputs of one or more machine-learning models that take the task directly or indirectly as inputs.

Figure 8:
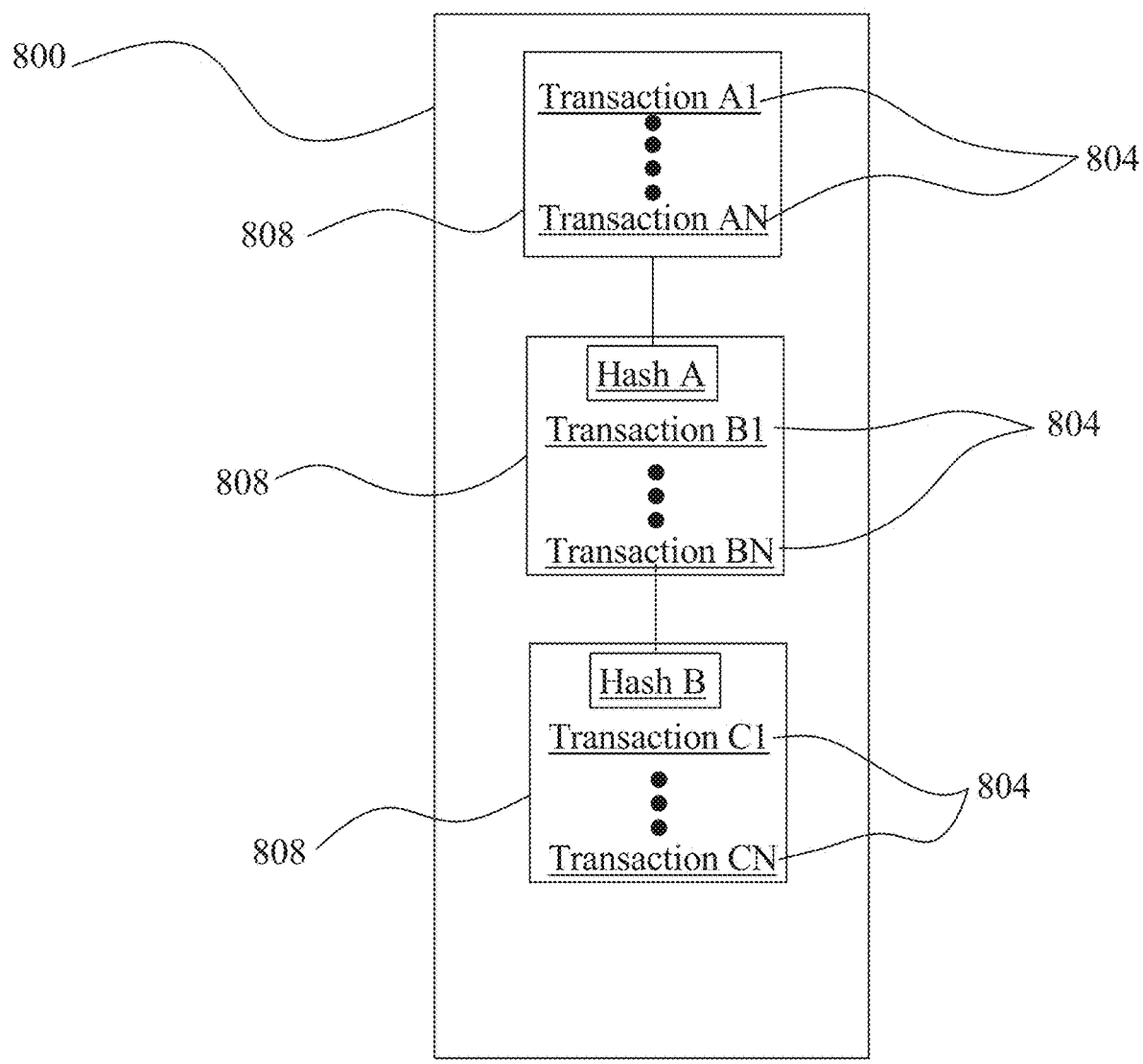
FIG. 8 an exemplary embodiment of an immutable sequential listing.

Referring now to FIG. 8, an exemplary embodiment of an immutable sequential listing 800 is illustrated. Data elements are "listing" in immutable sequential listing 800; data elements may include any form of data, including textual data, image data, encrypted data, cryptographically hashed data, and the like. In a nonlimiting example, data elements may include projection report 136. In some examples, without limitations, data elements may include at least a projection 136. In an example, without limitation, data elements may include user input 112. Data elements may include, without limitation, one or more at least a digitally signed assertions. In one embodiment, a digitally signed assertion 804 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 804. In an embodiment, collection of textual data states that the owner of a certain transferable item represented in a digitally signed assertion 804 register is transferring that item to the owner of an address. A digitally signed assertion 804 may be signed by a digital signature created using the private key associated with the owner's public key, as described above.

Still referring to FIG. 8, a digitally signed assertion 804 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 804 may describe the transfer of $\alpha$ physical good; for instance, a digitally signed assertion 804 may describe the sale of $\alpha$ product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 804 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 8, in one embodiment, an address is a textual datum identifying the recipient of virtual currency or another item of value in a digitally signed assertion 804. In some embodiments, address is linked to a public key, the corresponding private key of which is owned by the recipient of a digitally signed assertion 804. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 804 may record a subsequent a digitally signed assertion 804 transferring some or all of the value transferred in the first a digitally signed assertion 804 to a new address in the same manner. A digitally signed assertion 804 may contain textual information that is not a transfer of some item of value in addition to, or as an alternative to, such a transfer. For instance, as described in further detail below, a digitally signed assertion 804 may indicate a confidence level associated with a distributed storage node as described in further detail below.

In an embodiment, and still referring to FIG. 8 immutable sequential listing 800 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 800 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of α given posted content.

Still referring to FIG. 8, immutable sequential listing 800 may preserve the order in which the at least a posted content took place by listing them in chronological order; alternatively or additionally, immutable sequential listing 800 may organize digitally signed assertions 804 into sub-listings 808 such as "blocks" in a blockchain, which may be themselves collected in a temporally sequential order; digitally signed assertions 804 within a sub-listing 808 may or may not be temporally sequential. The ledger may preserve the order in which at least a posted content took place by listing them in sub-listings 808 and placing the sub-listings 808 in chronological order. The immutable sequential listing 800 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 800 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 8, immutable sequential listing 800, once formed, may be inalterable by any party, no matter what access rights that party possesses. For instance, immutable sequential listing 800 may include a hash chain, in which data is added during a successive hashing process to ensure non-repudiation. Immutable sequential listing 800 may include a block chain. In one embodiment, a block chain is immutable sequential listing 800 that records one or more new at least a posted content in a data item known as a sub-listing 808 or "block." An example of a block chain is the BITCOIN block chain used to record BITCOIN transactions and values. Sub-listings 808 may be created in a way that places the sub-listings 808 in chronological order and link each sub-listing 808 to a previous sub-listing 808 in the chronological order so that any computing device may traverse the sub-listings 808 in reverse chronological order to verify any at least a posted content listed in the block chain. Each new sub-listing 808 may be required to contain a cryptographic hash describing the previous sub-listing 808. In some embodiments, the block chain contains a single first sub-listing 808 sometimes known as a "genesis block."

Still referring to FIG. 8, the creation of a new sub-listing 808 may be computationally expensive; for instance, the creation of a new sub-listing 808 may be designed by a "proof of work" protocol accepted by all participants in forming the immutable sequential listing 800 to take a powerful set of computing devices a certain period of time to produce. Where one sub-listing 808 takes less time for a given set of computing devices to produce the sub-listing 808 protocol may adjust the algorithm to produce the next sub-listing 808 so that it will require more steps; where one sub-listing 808 takes more time for a given set of computing devices to produce the sub-listing 808 protocol may adjust the algorithm to produce the next sub-listing 808 so that it will require fewer steps. As an example, protocol may require a new sub-listing 808 to contain a cryptographic hash describing its contents; the cryptographic hash may be required to satisfy a mathematical condition, achieved by having the sub-listing 808 contain a number, called a nonce, whose value is determined after the fact by the discovery of the hash that satisfies the mathematical condition. Continuing the example, the protocol may be able to adjust the mathematical condition so that the discovery of the hash describing a sub-listing 808 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 808 according to the protocol is known as "mining." The creation of a new sub-listing 808 may be designed by a "proof of stake" protocol as will be apparent to those skilled in the art upon reviewing the entirety of this disclosure.

Continuing to refer to FIG. 8, in some embodiments, protocol also creates an incentive to mine new sub-listings 808. The incentive may be financial; for instance, successfully mining a new sub-listing 808 may result in the person or entity that mines the sub-listing 808 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 808 Each sub-listing 808 created in immutable sequential listing 800 may contain a record or at least a posted content describing one or more addresses that receive an incentive, such as virtual currency, as the result of successfully mining the sub-listing 808.

With continued reference to FIG. 8, where two entities simultaneously create new sub-listings 808, immutable sequential listing 800 may develop a fork; protocol may determine which of the two alternate branches in the fork is the valid new portion of the immutable sequential listing 1XX by evaluating, after a certain amount of time has passed, which branch is longer. "Length" may be measured according to the number of sub-listings 808 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 808 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 800 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 800.

Still referring to FIG. 8, additional data linked to at least a posted content may be incorporated in sub-listings 808 in the immutable sequential listing 80; for instance, data may be incorporated in one or more fields recognized by block chain protocols that permit a person or computer forming a at least a posted content to insert additional data in the immutable sequential listing 800. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 8, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP. currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 808 in a block chain computationally challenging; the incentive for producing sub-listings 808 may include the grant of new crypto-currency to the miners. Quantities of crypto-currency may be exchanged using at least a posted content as described above.

Figure 9:
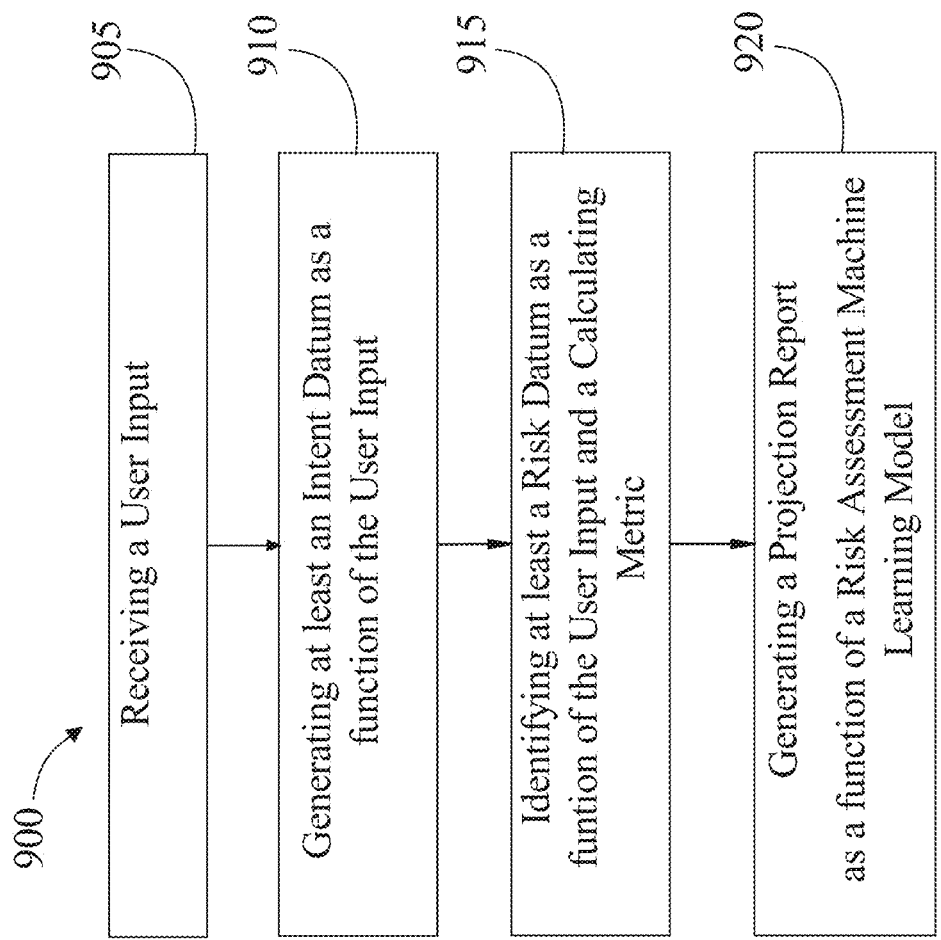
FIG. 9 is an exemplary embodiment of a method of automated risk assessment.

Now referring to FIG. 9, a method 900 of automated risk assessment if illustrated. In an embodiment, method 900, at step 905, includes receiving user input 112.

Still referring to FIG. 1, in an embodiment, at step 910, method 900 includes generating at least an intent datum 120 as a function of user input 112. In some embodiments, generating at least an intent datum 120 may include mapping user input 112 to at least a projected intent 124.

Continuing to refer to FIG. 9, in some embodiments, at step 915, method 900 includes identifying at least a risk datum 128 as a function of user input 112 and at least a calculating metric 124. In some embodiments, method 900 may further include identifying at least a risk datum 128 using a fuzzy set comparison.

Still referring to FIG. 9, in an embodiment, method 900, at step 920, includes generating projection report 136 as a function of user input 112 and at least a risk datum 128. In embodiments, method 900 may further include generating projection report 136 as a function risk assessment machine learning model 140. In some embodiments, risk assessment machine learning model may receive user input 112 and at least a risk datum 128 as inputs and output projection report 136. In some embodiments risk assessment machine learning model may receive user input 112 and at least a risk datum 128 as inputs and output at least a projection 136.

With continued reference to FIG. 9, in some embodiments, method 900 may further include transmitting projection report 136 to user device 148. In embodiments, user input 112 may include customer financial data 116. In embodiments, projection report 136 may include a qualification worksheet. In embodiments, projection report 136 may include an asset protection letter. In embodiments, projection report 136 may include an asset risk analysis chart. In some embodiments, projection report 136 may include a funding roadmap. In embodiments, method 900 may include receiving user input 112 using a chatbot. In embodiments, risk assessment machine learning model may be a neural network.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
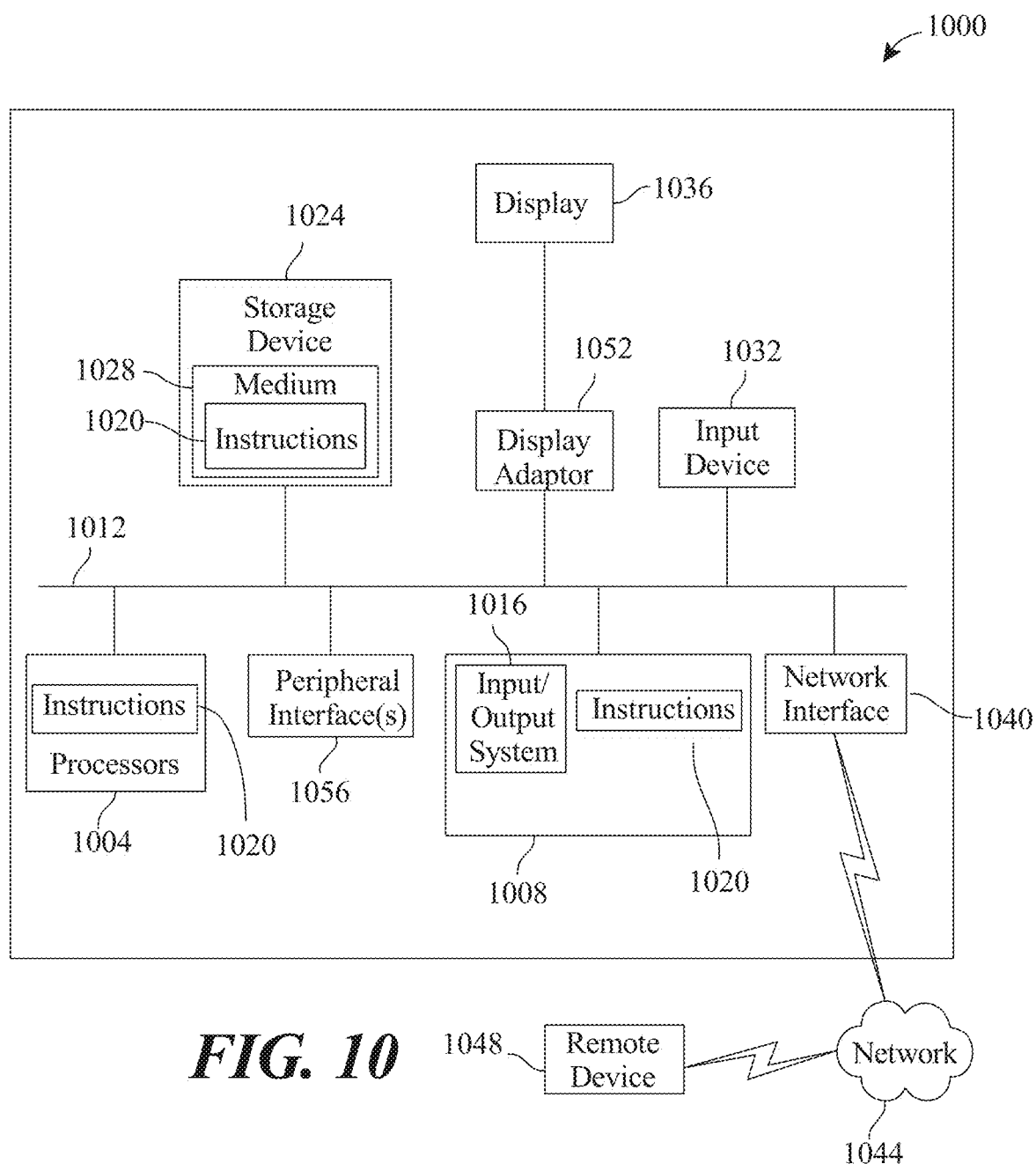
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of $\alpha$ variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of α variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of α variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for automated risk assessment, wherein the apparatus comprises:
   at least a processor; and
   a memory communicatively connected to the at least a processor, wherein the memory containing instructions configuring the at least a processor to:
   receive a user input;
   generate at least an intent datum as function of the user input, wherein generating the at least an intent datum comprises mapping user input to at least a projected intent;
   identify at least a risk datum as a function of the at least an intent datum and at least a calculation metric; and
   generate a projection report, wherein generating the projection report further comprises:
   creating risk assessment training data, wherein the risk assessment training data is preprocessed based on a feature selected during preprocessing, and wherein the risk assessment training data correlating at least an intent datum as an input to at least a risk datum as an output;
   iteratively training a risk assessment machine learning model wherein the risk assessment machine learning model is trained using the risk assessment training data,
   wherein iteratively training the risk assessment machine learning model using the risk assessment training data further comprises:
   applying a weighted value to an input layer of nodes comprising the at least an intent datum input, one or more intermediate layers, and an output layer of nodes comprising the at least a risk datum output;
   adjusting one or more connections and one or more weights between nodes in adjacent layers of the risk assessment machine learning model to iteratively update the output layer of nodes by updating the risk assessment training data by incorporating prior iterations of the risk assessment machine learning model;
   generate an asset risk analysis as a function of the projection report and the risk assessment machine learning model.

2. The apparatus of claim 1, wherein the processor is further configured to receive the user input using a chatbot.

3. The apparatus of claim 1, wherein the processor is configured to receive the at least a calculation metric using a natural language model.

4. The apparatus of claim 1, wherein identifying at least a risk datum further comprises using a fuzzy set comparison.

5. The apparatus of claim 1, wherein generating at least an intent datum comprises using a neural network.

6. The apparatus of claim 1, wherein the risk assessment machine learning model is a neural network.

7. The apparatus of claim 1, wherein the processor is further configured to generate a semantic meaning category using the user input.

8. The apparatus of claim 7, wherein the processor is further configured to generate, using a chatbot, a prompt as a function of the semantic meaning category.

9. The apparatus of claim 1, wherein the at least a processor is further configured to:
   generate an expert inquiry as a function of the projection report; and
   transmit the expert inquiry to an expert device.

10. A method of automated risk assessment, wherein the method comprises:
    receiving, by at least a processor, a user input;
    generating, by the at least a processor, at least an intent datum as function of the user input, wherein generating the at least an intent datum comprises mapping user input to at least an intent;
    identifying, by the at least a processor, at least a risk datum as a function of the user input and at least a calculation metric; and
    generating, by the at least a processor, wherein generating the projection report further comprises:
    creating risk assessment training data, wherein the risk assessment training data is preprocessed based on a feature selected during preprocessing, and wherein the risk assessment training data correlating at least an intent datum as an input to at least a risk datum as an output;
    iteratively training a risk assessment machine learning model, wherein the risk assessment machine learning model is trained using the risk assessment training data;
    wherein iteratively training the risk assessment machine learning model using the risk assessment training data further comprises:
    applying a weighted vale to an input layer of nodes comprising the at least an intent datum input, one or more intermediate layers, and an output layer of nodes comprising the at least a risk datum output;
    adjusting one or more connections and one or more weights between nodes in adjacent layers of the risk assessment machine learning model to iteratively update the output layer of nodes by updating the risk assessment training data by incorporating prior iterations of the risk assessment machine learning model;
    generating, by the at least a processor, an asset risk analysis as a function of the projection report and the risk assessment machine learning model.

11. The method of claim 10, wherein the method further comprises receiving the user input using a chatbot.

12. The method of claim 10, wherein the method further comprises receiving the at least a calculation metric using a natural language model.

13. The method of claim 10, wherein identifying the at least a risk datum further comprises using a fuzzy set comparison.

14. The method of claim 10, wherein generating at least an intent datum comprises using a neural network.

15. The method of claim 10, wherein the risk assessment machine learning model is a neural network.

16. The method of claim 10, wherein the method further comprises generating a semantic meaning category using the user input.

17. The method of claim 16, wherein the method further comprises generating, using a chatbot, a prompt as a function of the semantic meaning category.

18. The method of claim 10, wherein the method further comprises:
   generating an expert inquiry as a function of the projection report; and
   transmitting the expert inquiry to an expert device.

* * * * *